United States Patent Office 3,109,554
Patented Nov. 5, 1963

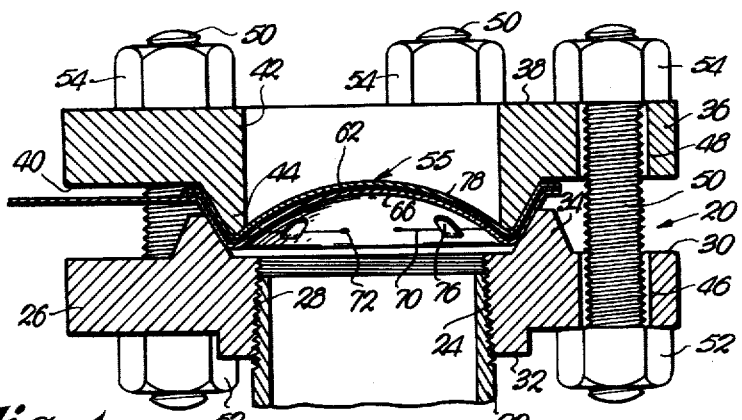

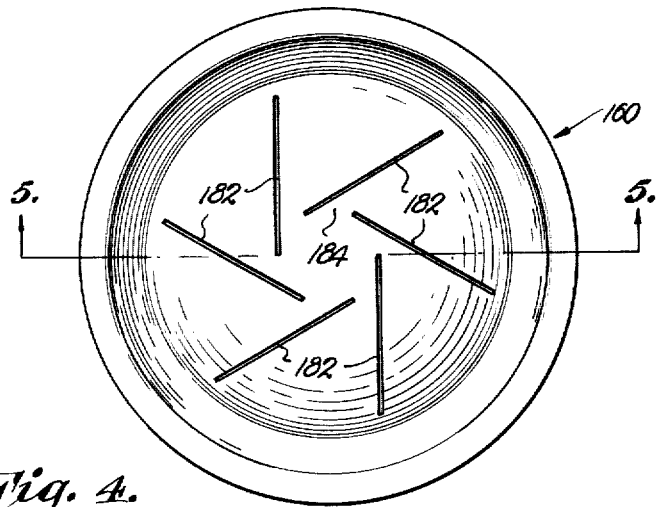
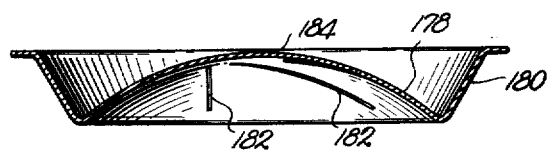
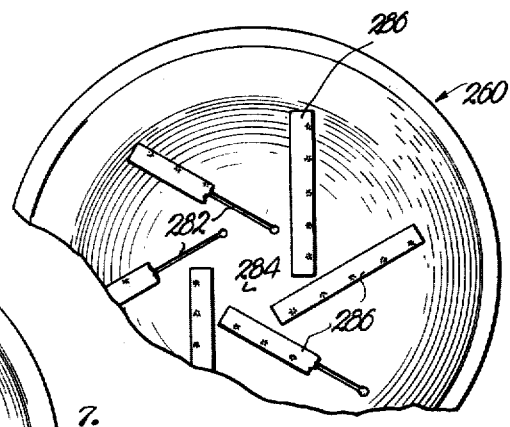
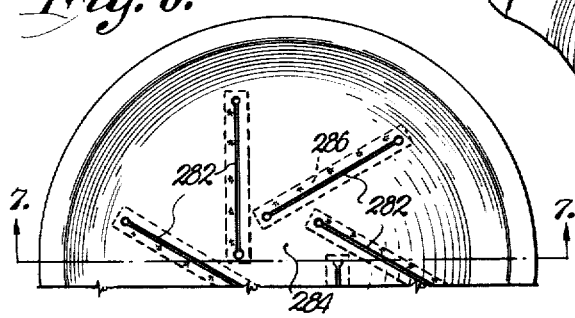
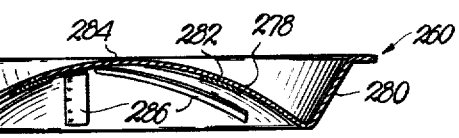

3,109,554
RUPTURE DISC UNIT
Louis M. Porter, Independence, and Franklin T. Speck, Oak Grove, Mo., assignors to Fike Metal Products Corp., Blue Springs, Mo., a corporation of Missouri
Filed Sept. 19, 1960, Ser. No. 56,844
2 Claims. (Cl. 220—89)

The present invention relates to safety pressure devices, frequently referred to as safety heads, which are used in the protection of pressure vessels or other equipment wherein dangerous pressures may occur. More particularly, the present invention relates to a cover disc used in conjunction with a frangible disc designed to rupture at a predetermined pressure differential. A conventional rupture disc is dome-shaped and usually positioned between the high and low pressure sides of a device, with the high pressure acting upon the concave face of the diaphragm or disc, so that when the pressure rises toward the danger point, the disc ruptures at the predetermined pressure for which it was designed, thereby relieving the excessive pressure.

In many installations, rupture discs of the general type described are completely satisfactory, but when the operating conditions are such that the pressure on the concave side of the disc approaches, but does not reach the predetermined pressure at which the rupture disc is designed to rupture, the disc may distort by ballooning outwardly. Such action weakens the rupture disc and has a tendency to form creases or folds in the rupture disc when the pressure is relieved and the disc returns to substantially its normal size. The rupture disc is thereby weakened to such an extent by the above described action that when the pressure again rises, the diaphragm will burst below its rated rupture pressure.

It is the primary object of this invention, therefore, to provide a safety device of the character described wherein is included means for preventing the ballooning or swelling of the rupture disc in case the system is subjected to a pressure greater than normal, but less than the predetermined rupture pressure of the rupture disc.

It is another object of the present invention to provide means for preventing the swelling or ballooning action of the rupture disc under pressures greater than normal but less than the predetermined rupture pressure of the disc, and which may be used in combination with a support disc located on the concave side of the rupture disc to prevent collapsing of the rupture disc when the pressure on the concave side of the disc drops below the pressure on the convex side of the rupture disc.

Further objects and advantages will appear as this specification proceeds and various modifications and changes may be made to the structure of the present invention without departing from the spirit thereof.

In the drawings:

FIGURE 1 is a cross-sectional view through a pressure head including a safety device embodying the present invention;

FIG. 2 is an exploded cross-sectional view of a safety disc assembly of the type shown in FIG. 1;

FIG. 3 is a top plan view of the uppermost disc shown in FIG. 2;

FIG. 4 is a top plan view of a second embodiment of the uppermost disc or cover disc;

FIG. 5 is a cross-sectional view through the disc of FIG. 4 taken along line 5—5 of FIG. 4 looking in the direction of the arrows;

FIG. 6 is a partial top plan view of a disc similar to that shown in FIG. 4, but provided with cut covering tabs;

FIG. 7 is a cross-sectional view of the embodiment shown in FIG. 6 taken along line 7—7 of FIG. 6 looking in the direction of the arrows; and FIG. 8 is a partial bottom plan view of the embodiment shown in FIG. 6.

In FIG. 1, a pressure head is designated generally by the numeral 20 and includes a pressure conduit 22 having a threaded end portion 24 adapted for mounting a first flange 26 provided with a central threaded opening 28 receiving the threaded end portion 24 of pressure conduit 22. First flange 26 has an upper face 30 and a lower face 32 with face 30 of flange 36 being provided with an upwardly projecting, annular land 34 that is generally trapezoidal in cross section. Land 34, although coaxial with central threaded opening 28, is spaced from threaded opening 28 in surrounding relationship thereto. A second flange 36 of approximately equal dimensions to and mounted on first flange 26, is provided with an upper face 38 and a lower face 40, and has a central opening 42 extending therethrough. A downwardly projecting, annular land 44 integral with the lower face 40 of flange 36, is of configuration substantially defining a right triangle in cross section and provided with a frusto-conical surface substantially complemental with the opposed surface of land 34. Annular land 44 defines the margins of central opening 42 at lower face 40.

Flange 26 is provided with a plurality of openings 46 in the outer periphery thereof, only one of which is shown, while flange 36 is likewise provided with a similar number of openings 48 in the outer margin of the same. Flanges 46 and 48 are normally positioned so that corresponding openings 46 and 48 are in register to thereby permit a threaded stud 50 to be passed through each pair of aligned openings 46 and 48, whereupon nuts 52 and 54 may be threaded over opposed ends of studs 50 to clamp flanges 26 and 36 tightly together. When the flanges 26 and 36 are clamped together as described, it is apparent that downwardly extending land 44 will fit complementally within upwardly projecting land 34. A safety pressure relief assembly generally designated by the number 55 is shown in FIG. 1 clamped between the respective lands 34 and 44.

Referring to FIG. 2, it may be seen that safety pressure relief assembly 55 is composed of a rupture disc generally designated by the numeral 56 which may be made from a material such as metal or plastic, with the rupture disc 56 being sandwiched between a vacuum support disc generally designated by the numeral 58, and a cover disc generally designated by the numeral 60. Rupture disc or diaphragm 56, includes a central, generally spherical dome portion 62 and an annular, planar outer peripheral flange 64 integral with dome 62. Rupture disc 56 is designed so that the central dome portion 62 thereof, will rupture at a predetermined pressure differential between the magnitude of the pressure on the concave and convex sides of the central dome portion 62. Vacuum support disc 58 includes a central, general spherical dome-shaped portion 66 and an outer peripheral flange 68 integral with dome-shaped portion 66. It will be noted that support disc 58 is of generally the same shape as rupture disc 56, and that the two are normally in complemental relationship.

Central dome-shaped portion 66 of support disc 58 is provided with an arcuate cut 70 having spaced ends 72 and 74. Arcuate cut 70 provides a zone of weakness in dome 66 between opposed ends of cut 70 and permitting the central dome portion 66 to rupture easily in the outward direction toward rupture disc 56. However, it is desirable to prevent dome 66 from shifting inwardly when a pressure drop takes place on the concave side of dome 66 as movement of the rupture disc 56 in this direction would weaken the dome portion of disc 56 and permit it to rupture at a lower pressure differential than that for which it was originally designed. For this purpose, structure is provided on the concave surface of dome 66 to prevent inward movement of the latter and comprising a plurality of angularly spaced tabs 76 which are fastened on the outer side of cut 70 to the concave surface of dome 66 and extend radially inward across the cut 70.

Tabs 76 may be fixed in any suitable manner such as by spot-welding and the tabs 76 will deter the inward collapse of dome 66 and of rupture disc 56, while at the same time not interfering in any way with the rupture of dome 66 and rupture disc 56 in the outward direction. It will be noted also, that support disc 58 covers the entire bottom surface area of rupture disc 56, not only supporting the same, but also protecting the same against injury from dirt or foreign matter which might be present.

Cover disc 60 also includes a central, generally spherical dome-shaped rupture portion 78 and an outer peripheral flange 80 integral with dome-shaped portion 78. Dome-shaped portion 78 is provided with a plurality of angularly-spaced, arcuate cuts 82, presenting zones of weakness intermittently located between the zones of strength represented by the angular spaces between arcuate cuts 82. It should be noted in this respect, that the solid areas between the cuts 82 and which may be generally designated by the number 84, extend generally transversely relative to the cuts 82 to the end that the zones of strength 84 are similar in their supporting capacity to the tabs 76 which were previously described relative to the support disc 58. The arcuate cuts 82 permit the cover disc 60 to rupture with the rupture disc 56 when the predetermined rupture pressure differential is reached, while the zones of strength 84 prevent the central dome area 78 of disc 60 from rupturing or expanding under pressures less than the predetermined differential necessary to rupture disc 56, thereby enabling the cover disc 60 to prevent ballooning or swelling action of the central dome area 62 of rupture disc 56.

The cover disc 60 covers the entire outer surface area of rupture disc 56 to prevent the latter from swelling or ballooning under greater than normal pressures which are not sufficiently great to cause disc 56 to rupture, but at the same time, cover disc 60 will also prevent injury to rupture disc 56 by foreign material, particularly when the same is used in an embodiment such as illustrated in FIG. 1 where, lacking the cover disc 60, the rupture disc 56 would be exposed to the atmosphere.

Referring now to FIGS. 4 and 5 of the drawings, a second embodiment of a cover disc is shown which may be generally designated by the numeral 160. Cover disc 160 is also provided with a dome portion 178 and an outer peripheral flange 180. Cover disc 160 is similar to cover disc 60 with the exception that in place of the arcuate cuts 82 of cover disc 60, cover disc 160 is provided with a plurality of cuts 182 which extend inwardly from the periphery of the central rupture area. The inner ends of cuts 182 are angularly spaced to define a central circular area generally denominated by the numeral 184 and to which cuts 182 are disposed in generally tangential relationship. It will be seen, of course, that the cuts 182 provide zones of weakness in the central rupture area 178 of cover disc 160, and that the angular spacing of the inner ends of cuts 182 provides zones of strength between the cuts 182. Since cover disc 160 ruptures in a generally circular line connecting the inner ends of cuts 182, it will be noted that the zones of strength between the inner ends are generally transverse to the line of rupture which is in keeping with the previous embodiment described. The zones of strength are sufficiently strong to prevent rupture of the central area 178 at less than the predetermined pressure required to rupture the rupture disc 56, but do not interfere with rupture of disc 56 at a predetermined pressure. Cover disc 160 is thereby capable of preventing the ballooning or swelling action previously described and at the same time protects the outer surface of rupture disc 56 from injury by foreign matter.

The embodiment of the present invention illustrated in FIGS. 6, 7 and 8, is generally similar to the structure shown in FIGS. 4 and 5, with the exception of provision of a plurality of cut covers 286 in underlying relationship to respective cuts 282. The cut covers 286 are of sufficient length to cover the entire longitudinal dimension of each of the cuts 282 and are spot-welded or otherwise connected to the under-surface of dome 278. It should be noted in this regard that the cut covers 286 are welded along one side only of a respective cut 282 to the under-surface of dome 278 so as not to interfere with rupturing action of the dome 278 or rupture area when a predetermined pressure is reached. The covers prevent injury to the rupture disc 56 which might occur if the disc could expand into the cuts 282 and become pinched therein.

In connection with the cuts of the various embodiments of rupture discs, it should be noted that the ends of each of the cuts 70, 82, and 282, are rounded out to insure that the rupturing action takes place between these rounded, preselected areas and not along a less acceptable line.

Having thus described the invention what is claimed as new and desired to be secured by Letters Patent is:

1. A pressure relief assembly for a pressure conduit comprising:

a rupture disc having a generally spherical portion rupturable at a selected pressure and presenting opposed, major convex and concave surfaces respectively, said rupture disc being adapted to be positioned in said conduit in closing relationship thereto with said concave surface thereof facing the pressure side of the conduit; and a cover disc overlying said rupture disc and having a generally spherical section rupturable at a predetermined pressure and in complemental engagement with said convex surface of the rupture disc, said spherical section being provided with a single series only of elongated, longitudinally arcuate, discontinuous slits therein of substantial length and arranged in a generally circular pattern coaxial with and spaced from the axis of said spherical section of the cover disc and spaced inwardly from the periphery of the cover disc adjacent thereto, each of the areas of the spherical section of said cover disc between adjacent extremities of said lines of weakness being of less width than the effective length of each of the lines of weakness but of sufficient size to withstand pressures somewhat below said predetermined pressure and incapable of withstanding severance thereof by a pressure exceeding said predetermined pressure whereby the rupture disc and the cover disc rupture at a pressure exceeding the sum of said selected pressure and the predetermined pressure while the cover disc protects the rupture disc against distortion and ballooning by pressure below the rupture pressure of the rupture disc and the cover disc but does not interfere with ultimate rupture thereof substantially at said rupture pressure.

2. An assembly as set forth in claim 1 wherein said spherical section of the cover disc is provided with openings therein at each extremity of each slit and of greater effective diameter than the width of the line of weakness therebetween.

References Cited in the file of this patent

UNITED STATES PATENTS

| | | |
|---|---|---|
| 2,548,744 | Simms | Apr. 10, 1951 |
| 2,716,506 | Fike | Aug. 30, 1955 |
| 2,766,904 | Philip | Oct. 16, 1956 |
| 2,875,921 | Coffman | Mar. 3, 1959 |
| 2,953,279 | Coffman | Sept. 20, 1960 |

UNITED STATES PATENT OFFICE
CERTIFICATE OF CORRECTION

Patent No. 3,109,554                                          November 5, 1963

Louis M. Porter et al.

It is hereby certified that error appears in the above numbered patent requiring correction and that the said Letters Patent should read as corrected below.

Column 4, line 40, for "slits" read -- lines of weakness --; line 62, for "slit" read -- line of weakness --.

Signed and sealed this 21st day of April 1964.

(SEAL)
Attest:

ERNEST W. SWIDER

Attesting Officer

EDWARD J. BRENNER

Commissioner of Patents